G. FINKEN.

Making Cube Sugar.

No. 1,269. Reissued Feb. 4, 1862.

Witnesses:

W. M. Compton

Lewis A. Tucker

Inventor:

Gust. Finken

AM. PHOTO-LITHO. CO. N.Y. (OSBORNE'S PROCESS.)

UNITED STATES PATENT OFFICE.

GUSTAVUS FINKEN, OF BROOKLYN, NEW YORK.

IMPROVEMENT IN APPARATUS FOR MANUFACTURING CUBE SUGAR.

Specification forming part of Letters Patent No. 33,078, dated August 20, 1861; Reissue No. 1,269, dated February 4, 1862.

*To all whom it may concern:*

Be it known that I, GUSTAVUS FINKEN, of the city of Brooklyn, in the county of Kings and State of New York, have invented a new and useful Improvement in the Manufacture of Cube Sugar; and I do hereby declare that the following is a full, clear, and exact description of the same, reference being had to the accompanying drawings, forming part of this specification, in which—

Figure 1:
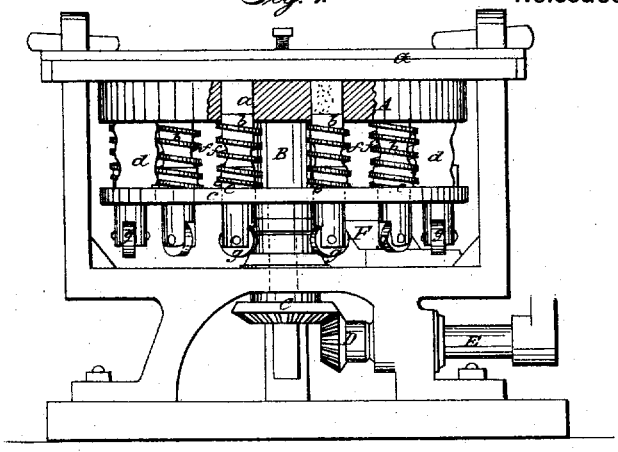
Figure 3:
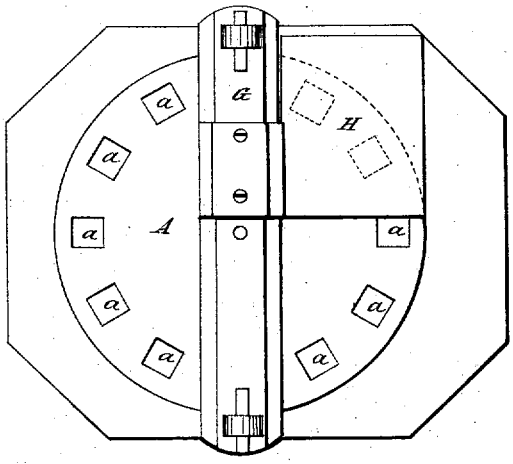
Figure 2:
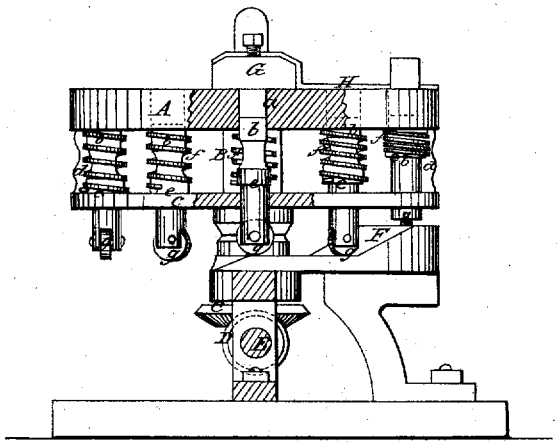

Figure 1 is a front elevation, partly in section, of a machine used in performing my invention. Fig. 2 is a side elevation of the same, also partly in section. Fig. 3 is a plan of the same.

Similar letters of reference indicate corresponding parts in the several figures.

One of the obstacles which has heretofore presented itself in the manufacture of cube sugar has been the want of suitable machinery by which to form the sugar into cubes with an economical application of power.

The object of this invention is to overcome the above obstacle, and to dispense, as far as practicable, with the manual labor in the manufacture; and to this end it consists in the formation of the cubes from the granular sugar by means of machinery composed of an endless or rotating series of molds fitted with compressing and discharging pistons, and having applied, in combination with them, a cam or cams or their equivalent for operating the pistons, one or more at a time, in regular succession throughout the whole of the series, whereby so long as a supply of granular sugar is supplied to the molds and the machinery is kept in motion a continuous delivery of compactly-compressed cubes is effected. The endless or rotating series of molds may be arranged in various ways, as in the periphery of a rotating cylinder or in a rotating disk; but I consider it best to arrange or form them in a horizontally-rotating disk or wheel, and have therefore represented in the drawings a machine having the molds constructed in such a disk.

A is the mold-disk, firmly secured to a vertical shaft, B, which works in fixed bearings in a suitable framing, and to which rotary motion is imparted by a pair of bevel-gears, C D, from a horizontal driving-shaft, E. The molds *a a* consist of square holes in the disk A, arranged in a circle concentric with the shaft B, or in two or more such circles, and each fitted with a piston or plunger, *b*, entering it at the bottom. The lower portions or stems of these pistons work in guides consisting of holes in a disk or plate, *c*, which is secured to the disk A by columns *d d*; and shoulders *e e* are provided on the said stems to prevent the pistons from dropping out of or too low within the molds *a a*. Springs *f f*, coiled round the pistons under the mold-disk A, keep the pistons down with their shoulders *e e* in contact with the plate *c*, until they are forced upward by passing over the stationary cam F, which is secured to or formed upon the framing of the machine below the plate *c*, and the said springs also press the pistons down again after they have been forced up by the cam. The stems of the pistons are fitted at their lower ends with anti-friction rollers *d d*, to facilitate their motion over the surface of the cam F, and the said cam is so constructed and arranged that each of the pistons will be caused to begin rising just as it is brought by the rotation of the disk A to a position under a stationary bar or plate, G, which extends across the top of the disk A, and, after having risen till its upper end or face is at a distance from the upper surface of the disk equal to the width of the molds *a a*, will remain stationary until it has passed some distance from under the said bar or plate G, when it will rise until its face is flush with the upper surface of the disk. The first rise of the piston is to compress the sugar in the molds against the under face of the bar or plate G, to produce the adhesion of the grains or crystals and form the cube, and the second to discharge the cube from the mold. A stationary plate or platform, H, is so situated above the disk with one edge, which is made very thin close to the upper face thereof, that the cubes, as they are discharged, are, by the continued rotation of the disk, deposited upon the said platform.

The sugar is prepared for molding by the process which forms the subject of my Letters Patent dated October 22, 1861—that is to say, by exposing it to the action of steam to render the surfaces of the crystals or granules sufficiently adhesive—and after this preparation it is fed into the molds by being placed in a suitable open-bottomed trough arranged close above the disk A, or by any other suitable means. As the molds and pistons are carried round by the rotation of the disk, the pistons are severally and successively, in regular order, brought into operation, first to compress and then to discharge the cubes, which, on being deposited upon the platform H, by the continued rotation of the disk A, may be carried away therefrom by any suitable means to a suitable receptacle.

It is obvious that the forms of the molds may be varied at pleasure according to the form it is desired to give the lumps of sugar. I have called these lumps "cubes," as that is the form in which the lumps are generally made.

I am aware that a series of molds formed in a metallic slab, and a series of corresponding pistons attached rigidly to a follower have been used for the formation of cubes in the manufacture of cube sugar; but with such a system of molds and pistons, if the number of molds were large, the power required to press the cubes would be great, and such a system is not adapted to be worked by steam or other power, as the power required has to be exerted intermittingly. The system of molds and pistons which I use is free from the above objections, as they come into operation, one or more at a time, in regular succession; and some molds are being filled while in others the pistons are compressing the sugar, others are being discharged, and others are on their way to be refilled, and the power required to operate the said system of molds and pistons is uniform.

I do not claim, broadly, the use of a number of molds and a number of pistons in the manufacture of cube sugar, yet I do not confine myself strictly to the particular arrangement of the molds and pistons herein described; but

What I claim as my invention, and desire to secure by Letters Patent, is—

The formation of the cubes from the granular sugar in the manufacture of cube sugar by means of machinery composed of an endless or rotating series of molds, filled with compressing and discharging pistons, and having applied, in combination with them, a cam or cams or their equivalent for operating the pistons, one or more at a time, in regular succession throughout the whole of the series, substantially as herein specified.

GUST. FINKEN.

Witnesses:
O. D. MUNN,
J. W. COOMBS.